United States Patent
McGinniss et al.

(10) Patent No.: US 6,342,563 B1
(45) Date of Patent: Jan. 29, 2002

(54) PREPARATION OF ADHESIVE (CO) POLYMERS FROM ISOCYANATE CHAIN EXTENDED NARROW MOLECULAR WEIGHT DISTRIBUTION TELECHELIC (CO) POLYMERS MADE BY PSEUDO LIVING POLYMERIZATION

(75) Inventors: Vincent D. McGinniss, Sunbury; Bhima R. Vijayendran, Upper Arlington, both of OH (US); Michiharu Yamamoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/575,284

(22) Filed: May 22, 2000

Related U.S. Application Data

(62) Division of application No. 08/965,548, filed on Nov. 6, 1997, now Pat. No. 6,121,380.

(51) Int. Cl.$^7$ .................................................. C08F 8/32
(52) U.S. Cl. ...................................................... 525/126
(58) Field of Search .......................................... 525/123

(56) References Cited

U.S. PATENT DOCUMENTS

| 4,446,246 A | 5/1984 | McGinniss et al. |
| 4,882,530 A | 11/1989 | Bronstert et al. |

FOREIGN PATENT DOCUMENTS

| EP | 0 632 075 A | 1/1995 |
| WO | WO 96/30421 A | 10/1996 |

*Primary Examiner*—Bernard Lipman
(74) *Attorney, Agent, or Firm*—Mueller and Smith, LPA

(57) ABSTRACT

Disclosed is a method for preparing adhesive polymers which commences with the formation of a poly-telechelic polymer of narrow molecular weight distribution (Mw/Mn) by polymerizing one or more radically-polymerizable monomers in the presence of a transition metal, a ligand, and an initiator, under atom or group transfer radical polymerization conditions. In this polymerization step, OH groups are contained on one or more of said initiator, an initiating monomer, a polymerizable monomer, a terminating monomer, or combinations thereof. The poly-telechelic polymer, then, is chain extended with a polyisocyanate to form the adhesive polymer.

10 Claims, No Drawings

PREPARATION OF ADHESIVE (CO) POLYMERS FROM ISOCYANATE CHAIN EXTENDED NARROW MOLECULAR WEIGHT DISTRIBUTION TELECHELIC (CO) POLYMERS MADE BY PSEUDO LIVING POLYMERIZATION

CROSS-REFERENCE TO RELATED APPLICATIONS

This application is a divisional application of U.S. Ser. No. 08/965,548, filed Nov. 6, 1997, now U.S. Pat. No. 6,121,980 the disclosure of which is expressly incorporated herein by reference.

STATEMENT REGARDING FEDERALLY SPONSORED RESEARCH

Not applicable.

BACKGROUND OF THE INVENTION

The present invention relates to the synthesis of adhesive compositions and more particularly to the synthesis of telechelic polymers of selected narrow molecular weight distribution for use in adhesives, coatings, and like applications. For present purposes, "telechelic" polymers are polymers that contain reactive end groups. "Polytelechelic" (co)polymers, then, contain two or more reactive pendant groups which often are end groups. For present purposes, "polymers" include homopolymers and copolymers (unless the specific context indicates otherwise), which may be block, random, gradient, star, graft (or "comb"), hyperbranched, or dendritic. The "(co)" parenthetical prefix in conventional terminology is an alternative, viz., "(co) polymer" means a copolymer or polymer, which includes a homopolymer.

Conventional free radical polymerization leads to synthesis of polymers with a fairly broad molecular weight distribution, Mw/Mn (weight molecular weight/number molecular weight), or polydispersity, in the range of 2.5 to 3. Number molecular weight (Mn) relies on the number of molecules in the polymer, while weight molecular weight relies on the weight of the individual molecules. See, e.g., Solomon, *The Chemistry of Organic Film Formers*, pp. 25, et seq., Robert E. Krieger Publishing Co., Inc., Huntington, N.Y. (1977), the disclosure of which is expressly incorporated herein by reference. The basic theory that applies to the control of the growth of the polymer chains and Mw/Mn ratios in a free-radical initiated polymerization reaction is well documented in the literature by P. J. Flory, *JACS*, Vol. 96, page 2718 (1952).

State of the art practice used to prepare polymers with a narrow molecular weight distribution in the range of, say, 1.05 to 1.4, rely on living polymerization techniques, such as anionic and cationic polymerization. These ionic living polymerization techniques have several limitations including, for example, restrictions on the types of monomers that can be polymerized, low temperature and purity process requirements, the inability to synthesize high molecular weight polymers, etc. Because of these constraints, ionic polymerization processes are limited to the synthesis of polymers based on styrene, isoprene, isobutylene, and like monomers to produce synthetic elastomers and thermoplastic rubbers.

Telechelic polymers prepared from either living polymers or condensation polymers, such as polyesters, for example, tend to be of low molecular weight, typically on the order of several hundreds to several thousands (e.g., 500–10,000). This low molecular weight limitation makes conventional telechelic polymers impractical for a variety of applications including, for example, adhesives.

Recent work on atom transfer radical polymerization (ATRP) has shown the potential of using this pseudo-living polymerization technique to prepare high molecular weight polymers based on acrylic monomers, vinyl monomers, and other common monomers which polymers exhibit a fairly narrow molecular weight distribution, say, in the range of 1.05 to 1.5. Molecular weights up to $10^5$ have been claimed to have been synthesized by ATRP techniques. See Patten, et al., "Radical Polymerization Yielding Polymers with Mw/Mn ~1.05 by Homogeneous Atom Transfer Radical Polymerization", *Polymer Preprints*, pp. 575–576, No. 37 (March 1996); Wang, et al., "Controlled/"Living" Radical Polymerization. Halogen Atom Transfer Radical Polymerization Promoted by a Cu(I)/Cu(II) Redox Process", *Macromolecules* 1995, 28, 7901–7910 (Oct. 15, 1995); and PCT/US96/03302, International Publication No. WO 96/30421, published Oct. 3, 1996, the disclosures of which are expressly incorporated herein by reference.

BRIEF SUMMARY OF THE INVENTION

Disclosed is a method for preparing adhesive polymers which commences with the formation of a poly-telechelic polymer of narrow molecular weight distribution (Mw/Mn), say from about 1–3, by polymerizing one or more radically-polymerizable monomers in the presence of a transition metal, a ligand, and an initiator, under atom or group transfer radical polymerization conditions. In this polymerization step, OH groups are contained on one or more of said initiator, an initiating monomer, a polymerizable monomer, a terminating monomer, or combinations thereof, that is, (i) one or more of the initiator, an initiating monomer, a hydroxy monomer, or combinations thereof; on (ii) one or more of a hydroxy monomer, a terminating monomer, or combinations thereof; or on (iii) one or more of the initiator, an initiating monomer, or terminating monomer, or combinations thereof. The poly-telechelic polymer, then, is chain extended with a chain extension agent, such as a polyisocyanate, to form the adhesive polymer.

Regression analysis reveals that the adhesive properties of the chain extended polymers is dependent primarily upon the Mn of the telechelic polymer and the hydroxyl monomer and/or initiator used in forming the telechelic polymers. Data demonstrating such adhesive properties is set forth herein.

DETAILED DESCRIPTION OF THE INVENTION

In the polytelechelic polymer formation step of the process, atom or group transfer radical polymerization conditions are used. Such conditions can be found described in, for example, the art cited above and incorporated herein be reference. Included in this step are a transition metal, a ligand, and an initiator.

Preferred transition metals are $Cu^{+1}$, and $Co^{+1}$, although many other transition metals have been disclosed in the art and may find advantage in the present invention. $Cu^{+1}$ halides, for example, are described with respect to catalyzed reactions of organic polyhalides with vinyl unsaturated compounds are well known by Bellus, Pure and *Applied Chemistry*, Vol. 57, No. 12, pp. 1827–1838 (1985). Complexing of transition metal halides with organic ligands as part of the initiator system is described in U.S. Pat. No. 4,446,246, for example. $Cu^{+1}$ halide-bipyridine complexes with active organic halide compounds are described to react with vinyl unsaturated compounds by Udding, et al., *J. Organic Chemistry*, Vol. 59, pp. 1993–2003 (1994). Organocobalt porphyrin complexes (alkyl cobaloximes) are described in the polymerization of acrylates by Wayland, et al., *JACS*, Vol. 116, pp. 7943–7966 (1994). $Cu^{+1}$ carboxylate complexes formed from thiophene carboxylates are described by Weij, et al., *Polymer Preprints*, Vol. 38, No. 1, pp. 685–686 (April 1997). The disclosures of the foregoing references are expressly incorporated herein by reference.

The generation of radical intermediates by reacting some transition metal species, including salts and/or complexes of Cu, Ru, Fe, Va, Nb, and others, with alkyl halides, R-X, is well documented (see Bellus, *Pure & Appl. Chem.*, 1985, 57, 1827; Nagashima, et al., *J. Org. Chem.*, 1993, 58, 464; Seijas, et al., *Tetrahedron*, 1992, 48(9), 1637; Nagashima, et al., *J. Org. Chem.*, 1992, 57, 1682; Hayes, *J. Am. Chem. Soc.*, 1988, 110, 5533; Hirao, et al., *Syn. Lett.*, 1990, 217; Hirao, et al., *J. Synth. Org. Chem.*, (Japan), 1994, 52(3), 197; Iqbal, et al., *Chem. Rev.*, 94, 519 (1994); Kochi, *Organometallic Mechanisms and Catalysis*, Academic Press, New York, 1978. Moreover, it also is known that R-X/transition metal species-based redox initiators, such as $Mo(CO)_6/CHCl_3$, $Cr(CO)_6/CCL_4$, $Co_4(CO)_{12}/CCl_4$, and $Ni[P(OPh))_3]_4 /CCl_4$, promote radical polymerization (see Bamford, *Comprehensive Polymer Science*, Allen, et al., editors, Pergamon: Oxford, 1991, vol. 3, p. 123). The participation of free radicals in these redox initiator-promoted polymerizations was supported by end-group analysis and direct observation of radicals by ESR spectroscopy (see Bamford, *Proc. Roy. Soc.*, 1972, A, 326, 431). The disclosures of the foregoing references are expressly incorporated herein by reference.

Ligands useful in the polytelechelic polymer formation step of the process also have been disclosed in the literature, such as set forth above. Such ligands most readily are halides; although, bipyridyls, mercaptides, triflates ($CuOSO_2CF_3$, *J. Am. Chem. Soc.*, 95, 1889 (1973), incorporated herein by reference), olefin and hydroxyl complexes (see, Cotton and Wilkinson, *Advanced Inorganic Chemistry*, $3^{rd}$ Ed. Chapter 23, John Wile & Sons, New York, N.Y. (1972; "Inorganic and Organometallic Photochemistry", M. S. Wrighton, Editor, *ACS-Advances in Chemistry Series*, 168 (1978); and Srinivasan, *J. Am. Chem. Soc.*, 85, 3048 (1963), incorporated herein by reference) can be used as necessary, desirable, or convenient. The disclosures of the foregoing references are expressly incorporated herein by reference.

Initiators also have been disclosed in the literature. Representative of such initiators include, for example, 2-hydroxyethyl 2-bromopropionate, 2-hydroxyethyl 4-bromopropionate, methyl 2-bromopropionate, 1-phenyl ethyl chloride, 1-phenylethyl bromide, chloroform, carbon tetrachloride, 2-chloropropionitrile, lower alkyl ($C_1$–$C_6$) esters of 2-halo-lower alkyl carboxylic acids (e.g., ethyl 2-bromoisobutyrate), α, α'-dichloroxylene, α, α'-dibromoxylene, hexakis(α-bromomethyl)benzene, and like. Obviously, halide initiators have been taught by the art to be preferred and such initiators serve quite efficaciously in the present invention. It should be observed, further, that photoinitiators also can be used, such as taught by M. P. Greuel, "Living Free-Radical Polymerization Using Alkyl Cobaloximes as Photoinitiators", Doctoral Thesis, University of Akron, December 1992. The disclosures of the foregoing references are expressly incorporated herein by reference.

Referring now to radically-polymerizable monomers, broadly, such monomers include any ethylenically unsaturated monomer or oligomer which can be (co)polymerized in the presence of a the initiator. In adhesives technology, acrylic or acrylate compounds find wide acceptance in industry. Another suitable class of ethylenically unsaturated compounds are vinyl compounds, while a third broad class are compounds containing backbone ethylenic unsaturation as typified by ethylenically unsaturated polyester oligomers. For terminating or capping the polymer ends with OH functionality, monomers modified to contain such functionality are used in the polymerization step of the present invention.

Referring with more particularity to reactive acrylic or acrylate monomers or oligomers, a variety of monoacrylate monomers find use in accordance with the present invention. Monoacrylates include, for example, allyl (meth)acrylate, $C_1$–$C_{22}$ alkyl and cycloalkyl (meth)acrylates, such as, for example, butyl acrylate, 2-ethylhexyl acrylate, isooctylacrylate, amyl acrylate, lauryl acrylate, iso-propyl acrylate, and the like, and corresponding monomethacrylates which include, for example, benzyl methacrylate, stearyl methacrylate, decyl methacrylate, cyclohexyl methacrylate, and the like, and mixtures thereof. The foregoing monomers are merely representative and not limitative of the list of acrylate and methacrylate monomers suitable for use in the present invention as those skilled in the art will appreciate.

Other suitable reactive compounds for use in the present invention include, for example, acrylated epoxy resins, acrylated silicone resins, acrylated polyurethane resins, and the like and mixtures thereof. Such acrylate-functional compounds are well known in the art and little more about them need be stated here.

Hydroxyl-containing acrylic monomers include hydroxyl derivatives of those monomers named above (e.g., hydroxy ethyl acrylate or hydroxy ethyl methacrylate), and the like, and mixtures thereof.

Hydroxy-functional initiators can be used in order to cap one end of the polymer (i.e., initiate the polymer). Alternatively, a pre-monomer can be used to start the polymerization which then proceeds with non-functional monomers. The other end of the polymer can be terminated with such functionality by choice of monomer which can be functional or a functional monomer (for example, allyl alcohol) can be post-polymerization added to cap the polymer with desired hydroxyl functionality. In this regard, it will be appreciated that the efficiency of hydroxyl incorporation into the telechelic (co)polymers is much greater when a hydroxy initiator or hydroxy initial monomer is used, rather than end-capping with a functional monomer, as those skilled in the art will appreciate. Mono and di-hydroxyl functional telechelic (co)polymers are preferred for use in the present invention; although, high functionality may be useful on occasion as is necessary, desirable, or convenient.

Polyisocyanates, preferably diisocyanates, are conventional in nature and include, for example, hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane ($H_6XDI$), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, and the like and mixtures thereof. Triisocyanates and high-functional isocyanates also are well known and can be used to advantage; although, diisocyanates are presently preferred. Aromatic and aliphatic diisocyanates, for example, (including biuret and isocyanurate derivatives) often are available as pre-formed commercial packages and can be used to advantage in the present invention. As with conventional urethane reactions, there should be a slight to moderate excess of isocyanate equivalents compared to the hydroxyl equivalents of the telechelic (co)polymers being chain extended.

The chain extended poly-telechelic polymers find wide use in formulating adhesives. Such adhesive polymers retain bond strength by dint of their higher molecular weight, but also exhibit good peel properties as do lower molecular weight polymers while still maintaining desired viscosities of prior art adhesives. Thus, the chain extended adhesive polymers exhibit a combination of bond strength which is expected of high molecular weight polymers, while also exhibiting peel properties expected of much lower molecular weight polymers. Such peel properties and good viscosities are believed to result because of the narrow molecular weight distribution of the poly-telechelic polymer intermediates synthesized in accordance with the precepts of the present invention.

The compounding of the inventive adhesive polymers into useful adhesive formulations follows conventional processing and handling which are well known to the skilled artisan. In this application, all units are in the metric system unless otherwise expressly indicated. Also, all citations are expressly incorporated herein by reference.

EXAMPLES

GENERAL PROCEDURES

Raw Materials

Butyl acrylate (BA), 4-hydroxybutyl acrylate (HBA), methyl 2-bromopropionate (2-MPN), 1-bromoethyl benzene (1-BEB), allylalcohol (AllylOH), 5-hydroxypentene (Pentene-OH), copper bromide (CuBr), and bipyridine were obtained from Aldrich Chemicals and used without further purification. 2-bromopropionic acid and anhydrous ethyleneglycol also were purchased from Aldrich Chemicals.

Hydroxy-Containing Initiator Synthesis Methods

2-Hydroxyethyl 2-Bromopropionate (2-H2PN)

Dicyclohexylcarbodiimide (4.1 g, 20 mmol), anhydrous ethylene glycol (5.0 g, 81 mmol), and pyridine (1 ml, 12 mmol) were charged into a vial. Acetone (14 ml) and 2-bromopropionic acid (1.5 ml, 16.7 mmol) were added while cooling the vial down with an ice bath to control the exothermic reaction. After stirring the vial's contents overnight, undissolved by-products were removed by filtration. To the filtered reaction mixture were added AcOEt (20 ml) and saturated NaCl water (15 ml) followed by shaking well. The reaction mixture separated into 2 layers. The upper AcOEt layer was washed with dilute HCl once and saturated NaCl water (15 ml) two more times and then dried with $MgSO_4$. After removing $MgSO_4$, AcOEt was rotary evaporated to obtain a crude product. This crude product was purified by silica gel chromatography (eluent: AcOEt:hexane=1:1 by weight) to yield 1.4 g (43% yield) product.

2-Hydroxyethyl 4-Bromopropionate (2-H4PN)

The foregoing procedure was repeated using 1,4-butanediol as the starting material and anhydrous ethyleneglycol.

EXAMPLES 1–12

Typical Polymerization Method
Table 1, Examples 1–12
2-MPN, HBA (Example 2)

BA (12.8 g, 100 mmol) was charged into a four-neck flask equipped with a mechanical stirrer, $N_2$ inlet, cooling condenser, and rubber septum. Bipyridine (400 mg, 2.56 mmol) and Cu(I)Br (123 mg, 0.86 mmol) were added to the flask. The flask was purged with $N_2$ for at least 1 hour after which 2-MPN initiator (96 μl, 0.86 mmol) was injected into the flask through the rubber septum at ambient temperature. The reaction mixture then was stirred while being heated up to 110°–120° C. for 6 hours.

After verifying that the conversion ratio (dried polymer weight/neat reaction polymer weight) exceeded 95%, HBA (130 μl, 0.94 mmol) was bulk added through the rubber septum at 110°–120° C. The reaction solution then was heated for another 3 hours after which heating ceased. The crude polymer was diluted with ethyl acetate (50 ml) and then washed with diluted aqueous HCl three times and saturated aqueous NaCl three times followed by drying with anhydrous $MgSO_4$. After filtering out $MgSO_4$ and removing ethyl acetate, the polymer residue was dried by a vacuum pump at 50° C. overnight.

2-H2PN, Pentene-OH (Example 12)

BA (25.6 g, 200 mmol) was charged into a four-neck flask equipped with a mechanical stirrer, $N_2$ inlet, cooling condenser, and rubber septum. Bipyridine (840 mg, 5.38 mmol) and Cu(I) Br (257 mg, 1.79 mmol) were added to the flask. The flask was purged with $N_2$ for at least 1 hour after which the bromo initiator, 2-H2PN (400 mg, 1.79 mol), was injected into the flask through the rubber septum at ambient temperature. The reaction mixture then was stirred for 6 hours while being heated up to 110°–120° C.

After verifying that the conversion ratio (dried polymer weight/neat reaction polymer weight) exceeded 95%, penteneOH (1.54 g, 17.9 mmol) was bulk added through the rubber septum at 110°–120° C. The reaction solution then was heated overnight after which heating ceased. The crude polymer was diluted with ethyl acetate (50 ml) and then washed with diluted aqueous HCl three times and saturated aqueous NaCl three times followed by drying with anhydrous $MgSO_4$. After filtering out $MgSO_4$ and removing ethyl acetate, the polymer residue was dried overnight by a vacuum pump at 50° C.

EXAMPLES 13–24

Typical Chain Extension Procedure

Table 2. Examples 13–24

Example 14 (below)

The polymer synthesized in Example 2 (Mn=15, 538, 1.35 g, 0.087 mol, 0.092 mmol OH equivalents) was charged into

TABLE 1

Hydroxy-Containing Polymers

| Example No. | Monomer | Initiator* | OH Comonomer | Terminator | Mn (calculated) | Mw | Mw/Mn |
|---|---|---|---|---|---|---|---|
| 1 (B-4-1) Comparative | BA (12.8 g, 100 mmol) | 2-MPN (0.27 mmol) | — | — | 43,567 (47,650) | 69,701 | 1.60 |
| 2 (B-8-2) | BA (12.8 g, 100 mmol) | 2-MPN (0.90 mmol) | HBA (0.94 mmol) | — | 15,538 (14,450) | 34,491 | 2.22 |
| 3 (B-19-1) | BA (12.8 g, 100 mmol) | 1-BEB (0.88 Mmol) | HBA (0.94 mmol) | — | 16,170 (14,580) | 30,319 | 1.88 |
| 4 (B-24-1) | BA (25.6 g, 200 mmol) | 1-BEB (1.79 mmol) | HBA (2.67 mol) | — | 16,041 (14,580) | 33,274 | 2.08 |
| 5 (B-13-1) | BA (12.7 g, 100 mmol) | 2-MPN (0.9 mmol) | — | AllylOH (1.47 mmol) | 14,677 (14,400) | 28,399 | 1.94 |
| 6 (B-48-1) | BA (25.6 g, 200 mmol) | 1-BEB (1.76 mmol) | — | AllylOH (excess) | 15,209 (14,600) | 26,923 | 1.77 |
| 7 (B-39-1) | BA (12.8 g, 100 mmol) | 2-H2PN (0.9 mmol) | — | — | 13,255 (14,500) | 31,482 | 3.02 |
| 8 (B-45-1) | BA (12.8 g, 100 mmol) | 2-H4PN (0.89 mmol) | — | — | 12,850 (14,600) | 31,193 | 2.43 |
| 9 (B-49-1) | BA (12.8 g, 100 mmol) | 2-H4PN (0.89 mmol) | HBA (0.91 mmol) | — | 15,103 (14,800) | 26,861 | 1.78 |
| 10 (B-46-1) | BA (25.6 g, 200 mmol) | 2-H4PN (1.78 mmol) | — | AllylOH (29.4 mmol) | 14,956 (14,700) | 33,234 | 2.22 |
| 11 (B-52-1) | BA (12.8 g, 100 mmol) | 2-H2PN (1.0 mmol) | — | AllylOH (110 mmol) | 84,926 (126,000) | 214,519 | 2.53 |
| 12 (B-56-1) | BA (25.6 g, 200 mmol) | 2-H2PN (200 mmol) | — | PenteneOH (17.9 mmol) | 21,897 (14,600) | 34,889 | 1.60 |

*Ratio of Initiator/CuBr/Bipyridine was fixed at 1 mol eq/1 mol eq/3 mol eq.

Example 1 synthesis is a control run in that neither the initiator nor any monomer contained hydroxy functionality, nor was the polymer terminated with a hydroxy terminating monomer. The polymers synthesized in Examples 2–4 both were synthesized using hydroxy functional co-monomers; although, the initiator did not contain hydroxy functionality. The polymers synthesized in Examples 5–6 were both initiated with non-hydroxy functional initiators and neither contained any hydroxy functional co-monomers; although, each was polymer was terminated with allyl alcohol. The polymers synthesized in Examples 7–8 were initiated with a hydroxy functional initiator, although, none of the monomers contained hydroxy functionality. The polymers synthesized in Examples 9–10 both were initiated with hydroxy functional monomers. In Example 9, however, a hydroxy functional co-monomer was used and in Example 10, the polymer was terminated with allyl alcohol. Finally, the polymers synthesized in Examples 11–12 were both initiated with a hydroxy functional initiator and terminated with either allyl alcohol (Example 11) or with pentene alcohol (Example 12).

a reaction vial and diluted with tetrahydrofuran (THF) (1.6 ml). Added thereto were 1 wt-% dibutyltin dilaurate (DBTL) in THF (120 mg, 1.9 $\mu$mol) and 10 wt-% 4,4'-methylenebis (phenyl isocyanate) (120 mg, 0.048 mmol, 0.096 mmol NCO equivalents, NCO/OH ratio in reaction mixture of 1.0) followed by stirring for 2 hours under heating at 60° C. The molecular weight of the resulting product was determined by gel permeation chromatography using polystyrene as the standard.

Following the general procedures detailed above, the polymers synthesized as reported in Table 1 were chain extended with 4,4'-methylenebis(phenyl isocyanate) to produce polymers which have utility in formulation adhesive compositions. The chain extension results are reported in Table 2, below

TABLE 2

Chain Extension by Reaction of Polymers of Table 1 (Examples 1–12) with Diisocyanates

| Chain Extension Ex. No. | Table 1 Ex. No. | Table 1 Data | | | NCO/OH (eq) | Chain Extension Data | | |
|---|---|---|---|---|---|---|---|---|
| | | Mn | Mw | Mw/Mn | | Mn | Mw | Mw/Mn |
| 13 | 1 | 43,567 | 69,701 | 1.60 | — | — | — | No Reaction |
| 14 | 2 | 15,538 | 34,491 | 2.22 | 1.0 | 25,036 | 50,558 | 2.02 |
| 15 | 3 | 16,170 | 30,319 | 1.88 | 1.2 | 22,983 | 108,529 | 4.72 |
| 16 | 4 | 16,041 | 33,274 | 2.08 | 1.2 | 23,761 | 287,627 | 12.11 |
| 17 | 5 | 14,677 | 28,399 | 1.94 | 1.2 | 15,865 | 35,338 | 2.23 |
| 18 | 6 | 15,209 | 26,923 | 1.77 | 1.4 | 18,523 | 33,706 | 1.82 |
| 19 | 7 | 13,255 | 31,482 | 3.02 | 1.4 | 18,274 | 55,090 | 3.02 |
| 20 | 8 | 12,850 | 31,193 | 2.43 | 1.2 | 16,607 | 57,084 | 3.44 |
| 21 | 9 | 15,103 | 26,861 | 1.78 | 2.0 | 46,587 | 259,875 | 5.18 |
| 22 | 10 | 14,956 | 33,234 | 2.22 | 1.5 | 27,148 | 73,219 | 2.70 |
| 23 | 11 | 84,926 | 214,519 | 2.53 | 1.4 | 106,001 | 334,315 | 3.15 |
| 24 | 12 | 21,897 | 34,889 | 1.60 | 1.8 | 48,438 | 252,259 | 5.22 |

The results reported in Table 2 indicate that a variety of hydroxy-containing polymers can be produced that have Mw/Mn values ranging between about 1.6 and 3.0. These results further demonstrate that chain extension of the hydroxy-containing polymers in Table 1 produces new polymers that have Mw/Mn values that range between 1.82 and 12.11. Although, the Mw/Mn values of the chain extended polymers do not exhibit the narrowness in number that their corresponding hydroxy functional telechelic (co)polymers from they are derived do, such chain extended (co)polymers indeed display very unusual adhesive properties as data presented below will demonstrate. Polymers that do not contain hydroxyl functionality (Example 1 in Table 1 and Example 29 in Table 2) do not react with the diisocyanate chain extenders.

EXAMPLE 25

Finally, the non-chain extended polymers synthesized in Examples 11 and 12 (Table 1), and the chain extended versions (same MDI isocyanate as in the previous examples) thereof synthesized in Examples 23 and 24 (Table 2), were tested for their adhesive qualities by measuring their tack by the Polyken Tack Test (see, for example, U.S. Pat. No. 4,183,834 for test details, the disclosure of which is expressly incorporated herein by reference). Additionally, two conventional polymers (identified as Reference 1 and Reference 2) were synthesized from the same ingredients as used in Examples 11 and 12, except that they were conventionally synthesized by free-radical addition polymerization. The results recorded are set forth in Table 3, below.

TABLE 3

| Test No. | Mn | Mw | Mw/Mn | Tack (grams/cm$^2$) |
|---|---|---|---|---|
| 1-Example 11 | 84,926 | 214,519 | 2.53 | 261 |
| 1-Example 23 | 106,001 | 334,315 | 3.15 | 128 |
| 2-Example 12 | 21,897 | 34,889 | 1.60 | 320 |

TABLE 3-continued

| Test No. | Mn | Mw | Mw/Mn | Tack (grams/cm$^2$) |
|---|---|---|---|---|
| 2-Example 24 | 48,438 | 252,259 | 5.22 | 284 |
| Reference 1 | 22,732 | 57,467 | 2.53 | 142 |
| Reference 2 | 122,157 | 320,608 | 2.62 | 55 |

These results demonstrate that the inventive polymers have good tack when synthesized, as expected. When they are chain-extended with an isocyanate, tack decreases, as expected; however, increased molecular weight conventionally translates into stronger bonds. Unexpectedly, it will be observed that the inventive isocyanate-extended telechelic polymers retained a much higher adhesive strength at the higher molecular weights. This is unexpected. For example, compare the tack results for Test No. 1—Example No. 23 and Reference 2. These polymers have about the same molecular weight; yet, the inventive polymer displays a tack of 128 g while the comparative polymer displays a tack of only 55 g. Moreover, the peel strength of the inventive isocyanate-extended telechelic polymers can be tailored by judicious selection of monomer ingredients and degree of reaction.

Thus, the inventive isocyanate-extended telechelic polymers can be synthesized to higher molecular weights to retain their strength by dint of the increased molecular weight, while also retaining a much high peel strength that heretofore would be expected of much lower molecular weight polymers. Truly, an unusual blend of performance characteristics are demonstrated by these data.

EXAMPLES 26–32

Additional hydroxy-functional block copolymers and their chain extended derivatives were synthesized by the procedures described above, as follows:

TABLE 4

| Example | Monomers* | Initiator | Terminator | Mn | Mw | Mw/Mn |
|---|---|---|---|---|---|---|
| 26 | BA/MMA/BA | 2-H2PN (1.8 mmol) | Allyl OH (110 mmol) | 23,000 | 44,000 | 1.9 |
| 27 | BA/STY/BA | 2-H2PN (1.8 mmol) | Pentene OH (210 mmol) | 23,000 | 50,000 | 2.19 |

*STY is styrene

TABLE 5

| Ex. No. | Table 5 Ex. No. | Mn | Mw | NCO/OH (eq) | Chain Extension Data | | Mw/Mn |
|---|---|---|---|---|---|---|---|
| 28 | 26 | 23,000 | 44,000 | 1.2 | 66,516 | 281,798 | 4.24 |
| 29 | 27 | 23,000 | 50,000 | 1.2 | 74,878 | 325,715 | 4.35 |

A comparison between the melt viscosities and cohesive strengths of conventional hot melt acrylic polymers and the new hot melt polymers described in Table 6 is set forth below.

TABLE 6[a]

| Example | Polymer | Relative Melt Viscosity[b] | Relative Cohesive Bond Strength[c] |
|---|---|---|---|
| 30 | Ref. 2 (Table 3) | 1 | 1 |
| 31 | 26 (Table 5) | 3.2 | 2 |
| 32 | 27 (Table 5) | 2.8 | 3 |

[a]The data has been normalized to 1 based on the reference sample.
[b]The higher the relative melt viscosity ratio, the greater the ability of the polymer to melt and flow.
[c]The higher the relative cohesive bond strength relative number, the greater the bond strength of the hot melt adhesives adhered to two pieces of aluminum metal.

Now, the only significant difference between polymer 26 and polymer 27 is the alcohol used to terminate the structure. It is believed that the pentene alcohol may be a mixture of pentene alcohols where branched species are present. It is believed that such branching is responsible for the different adhesive performances reported herein. Note, that the reported tack data in Table 3 also shows a marked difference in adhesive performance between those polymers terminated with allyl alcohol and those terminated with pentene alcohol.

When end-capping the telechelic (co)polymer, is conceivable that the inefficiencies of such process may produce a mixture of hydroxyl-capped (co)polymer and initial telechelic (co)polymer. Such mixture may be termed a "self-assembled" adhesive because a balance of properties is achieved in situ by the synthesis steps (mixture of components) rather than by blending different components as is conventional in adhesive formulation technology. Based on these results, it is believed that the relative tack value, Mn and Mw of the chain extended polymers, can be predicted based on the Mn of the initial telechelic polymers synthesized as disclosed herein.

What is claimed is:

1. An adhesive (co)polymer, which comprises:
   a polyisocyanate chain extended poly-telechelic (co)polymer wherein said poly-telechelic (co)polymer has a narrow molecular weight distribution (Mw/Mn) and is made by polymerizing one or more radically-polymerizable monomers in the presence of a transition metal, a ligand, and an initiator, under atom or group transfer radical polymerization conditions, wherein OH groups are contained on one or more of said initiator, an initiating monomer, a polymerizable monomer, a terminating monomer, or combinations thereof.

2. The adhesive (co)polymer of claim 1, wherein said transition metal is $Cu^{+1}$ or $Co^{+1}$.

3. The adhesive (co)polymer of claim 2, wherein said $Cu^{+1}$ transition metal is supplied from a $Cu^{+1}$ halide-bipyridine complex.

4. The adhesive (co)polymer of claim 2, wherein said $Co^{+1}$ transition metal is supplied from an organocobalt porphyrin complex.

5. The adhesive (co)polymer of claim 1, wherein said ligand is selected from the group consisting of halides, bipyridyls, mercaptides, triflates, olefins, hydroxyl complexes, and combinations thereof.

6. The adhesive (co)polymer of claim 1, wherein said initiator is selected from the group consisting of 2-hydroxyethyl 2-bromopropionate, 2-hydroxyethyl 4-bromopropionate, methyl 2-bromopropionate, 1-phenyl ethyl chloride, 1-phenylethyl bromide, chloroform, carbon tetrachloride, 2-chloropropionitrile, $C_1$–$C_6$ esters of 2-halo-$C_1$–$C_6$ carboxylic acids, $\alpha,\alpha'$-dichloroxylene, $\alpha,\alpha'$-dibromoxylene, hexakis(a-bromomethyl)benzene, and combinations thereof.

7. The adhesive (co)polymer of claim 1, wherein said polyisocyanate is selected from the group consisting of hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane ($H_6$XDI), dicyclohexylmethane diisocyanate ($H_{12}$MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, and combinations thereof.

8. The adhesive (co)polymer of claim 1, wherein said radically-polymerizable monomers are selected from the group consisting of allyl (meth)acrylate, $C_1$–$C_{22}$ alkyl and cycloalkyl (meth)acrylates, (meth)acrylated epoxy resins, (meth)acrylated silicone resins, (meth)acrylated polyurethane resins, hydroxyl derivatives of the foregoing monomers, and combinations thereof.

9. The adhesive (co)polymer of claim 1, wherein said hydroxyl groups are contained on:
(i) one or more of said initiator, an initiating monomer, a polymerizable monomer, or combinations thereof;
(ii) one or more of a polymerizable monomer, a terminating monomer, or combinations thereof; or
(iii) one or more of said initiator, an initiating monomer, a terminating monomer, or combinations thereof. (iii) one or more of said initiator, an initiating monomer, a terminating monomer, or combinations thereof.

10. The adhesive (co)polymer of claim 1, wherein a terminating hydroxyl monomer is used for form said poly-telechelic (co)polymer and the adhesive (co)polymer comprises a mixture of said poly-telechelic (co)polymer and said chain-extended poly-telechelic (co)polymer.

* * * * *